(12) United States Patent
Leung

(10) Patent No.: US 8,416,263 B2
(45) Date of Patent: Apr. 9, 2013

(54) ALIGNMENT OF OBJECTS IN AUGMENTED REALITY

(75) Inventor: Henry Leung, Calgary (CA)

(73) Assignee: Empire Technology Development, LLC, Wilmington, DE (US)

( * ) Notice: Subject to any disclaimer, the term of this patent is extended or adjusted under 35 U.S.C. 154(b) by 642 days.

(21) Appl. No.: 12/719,100

(22) Filed: Mar. 8, 2010

(65) Prior Publication Data

US 2011/0216089 A1 Sep. 8, 2011

(51) Int. Cl.
G09G 5/00 (2006.01)
G06K 9/32 (2006.01)

(52) U.S. Cl. .......................................... 345/633; 382/294

(58) Field of Classification Search .................... None
See application file for complete search history.

(56) References Cited

U.S. PATENT DOCUMENTS

| 5,926,568 | A | 7/1999 | Chaney et al. |
| 2002/0095276 | A1 | 7/2002 | Rong et al. |
| 2006/0098897 | A1 | 5/2006 | Dewaele |
| 2007/0014457 | A1 | 1/2007 | Jolly et al. |
| 2008/0175507 | A1 | 7/2008 | Lookingbill et al. |
| 2010/0045701 | A1* | 2/2010 | Scott et al. .................... 345/633 |

OTHER PUBLICATIONS

Zhang et al.; "Multimodiality Medical Image Registration Using Hybrid Optimization", International Conference on BioMedical Engineering and Informatics (2008).

Azuma; "A Survey of Agumented Reality": Presence: Teleoperators and Virtual Environments 6, 4 (Aug. 1997), 355-385.
International Preliminary Report on Patentability for application with application No. PCT/US2011/025040, dated Sep. 11, 2012, 5 pages.
PCT International Search Report PCT/ISA/210 for PCT/US11/25040 dated Aug. 25, 2011.
PCT Written Opinion of the International Searching Authority PCT/ISA/237 for PCT/US11/25040 dated Aug. 25, 2011.
Zhang et al.; "Multimodality Medical Image Registration Using Hybrid Optimization Algorithm", bmei, vol. 2, pp. 183-187 (2008).

* cited by examiner

*Primary Examiner* — Ryan R Yang
(74) *Attorney, Agent, or Firm* — Steven S. Rubin, Esq.; Moritt Hock & Hamroff LLP

(57) ABSTRACT

Technologies are generally described for aligning objects in augmented reality. In some examples, a processor may be adapted to receive detected image data and virtual object data. In some examples, the processor may further be adapted to generate and apply weights to log-likelihood functions at intensity and feature levels based on the virtual object data and detected image data. In some examples, the processor may further be adapted to add the weighted log-likelihood function at intensity level to the weighted log-likelihood function at feature level to produce a cost function. In some examples, the processor may further be adapted to determine transformation parameters based on the cost function that may be used to align the detected image data with virtual object data.

29 Claims, 6 Drawing Sheets

300 A computer program product.

302 A signal bearing medium.

304

At least one of
One or more instructions for a method for aligning data regarding a real object and a virtual object in an augmented reality system; or
One or more instructions for receiving detected image data at a processor, wherein the detected image data relates to the real object; or
One or more instructions for receiving virtual object data at the processor, wherein the virtual object data is representative of the virtual object in the augmented reality system; or
One or more instructions for generating, by the processor, a log-likelihood function at intensity level based on the virtual object data and the detected image data; or
One or more instructions for generating, by the processor, a log-likelihood function at feature level based on the virtual object data and the detected image data; or
One or more instructions for applying, by the processor, a first weight to the log-likelihood function at intensity level to produce a weighted log-likelihood function at intensity level; or
One or more instructions for applying, by the processor, a second weight to the log-likelihood function at feature level to produce a weighted log-likelihood function at feature level; or
One or more instructions for adding, by the processor, the weighted log-likelihood function at intensity level to the weighted log-likelihood function at feature level to produce a cost function; or
One or more instructions for determining, by the processor, transformation parameters for the detected image data based on the cost function; wherein the transformation parameters are effective to align the detected image data with the virtual object data.

| 306 A computer readable medium | 308 A recordable medium | 310 A communications medium |

Fig. 5

ALIGNMENT OF OBJECTS IN AUGMENTED REALITY

BACKGROUND

Unless otherwise indicated herein, the materials described in this section are not prior art to the claims in this application and are not admitted to be prior art by inclusion in this section.

In an augmented reality system, a user's view of the real world is enhanced or augmented with additional information generated by a computing device. Through a display provided to the user, the user may see virtual geometric objects placed onto real objects in a scene of interest. Additionally, non-geometric virtual information may be added about real objects and displayed on the display.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 5 illustrates example computer program products for alignment of objects in augment reality.

Figure 1:
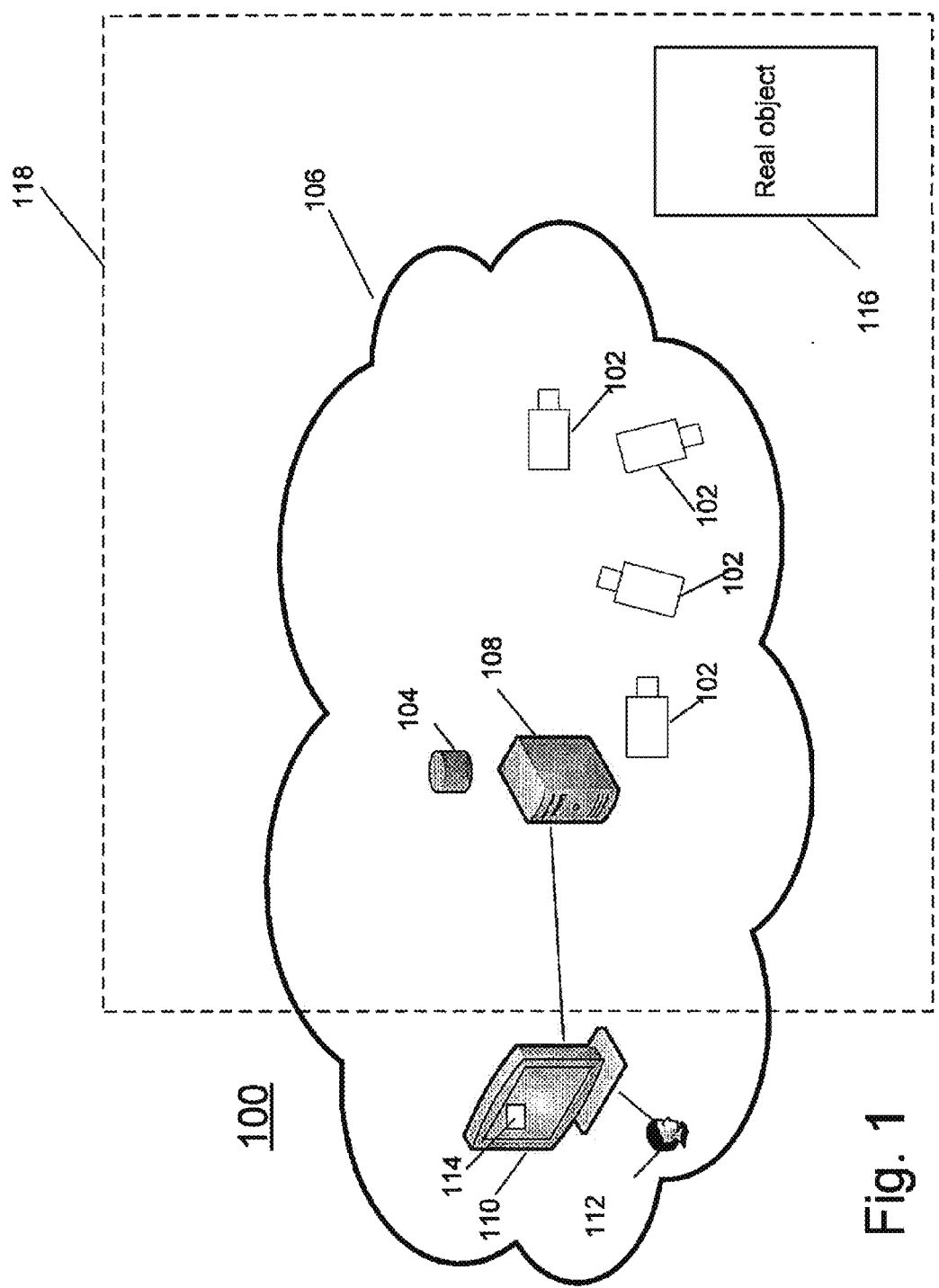
FIG. 1 illustrates some example systems that can be utilized to implement alignment of objects in augment reality.

all arranged according to at least some embodiments presented herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to alignment of objects in augmented reality.

Briefly stated, technologies are generally described for aligning objects in augmented reality. In some examples, a processor may be adapted to receive detected image data and virtual object data. In some examples, the processor may further be adapted to generate and apply weights to log-likelihood functions at intensity and feature levels based on the virtual object data and detected image data. In some examples, the processor may further be adapted to add the weighted log-likelihood function at intensity level to the weighted log-likelihood function at feature level to produce a cost function. In some examples, the processor may further be adapted to determine transformation parameters based on the cost function that may be used to align the detected image data with virtual object data.

FIG. 1 illustrates some example systems that can be utilized to implement alignment of objects in augmented reality in accordance with at least some embodiments presented herein. System 100 may include a one or more sensors 102, a memory 104 and a display 110 all arranged in communication with a processor 108. Processor 108 may be arranged in communication with sensors 102 and memory 104 through, for example, a network 106. As discussed in more detail below, sensors 102 may be adapted to detect detected image data regarding a real object 116 in a scene of interest 118. Sensors 102 may be further adapted to send the detected image data to processor 108. Processor 108 may be adapted to retrieve virtual object data from memory 104 regarding a virtual object or objects to be aligned with real object 116. Processor 108 further may be adapted to retrieve an alignment algorithm from memory 104. Using the alignment algorithm, processor 108 may be adapted to align the virtual object data with the detected image data to produce an enhanced image of object 116. Processor 108 may be adapted to display the enhanced image in an image 114 of a scene of interest 118 on display 110 for a user 112. The components of system 100 could be disposed anywhere inside or outside scene of interest 118.

Figure 2:
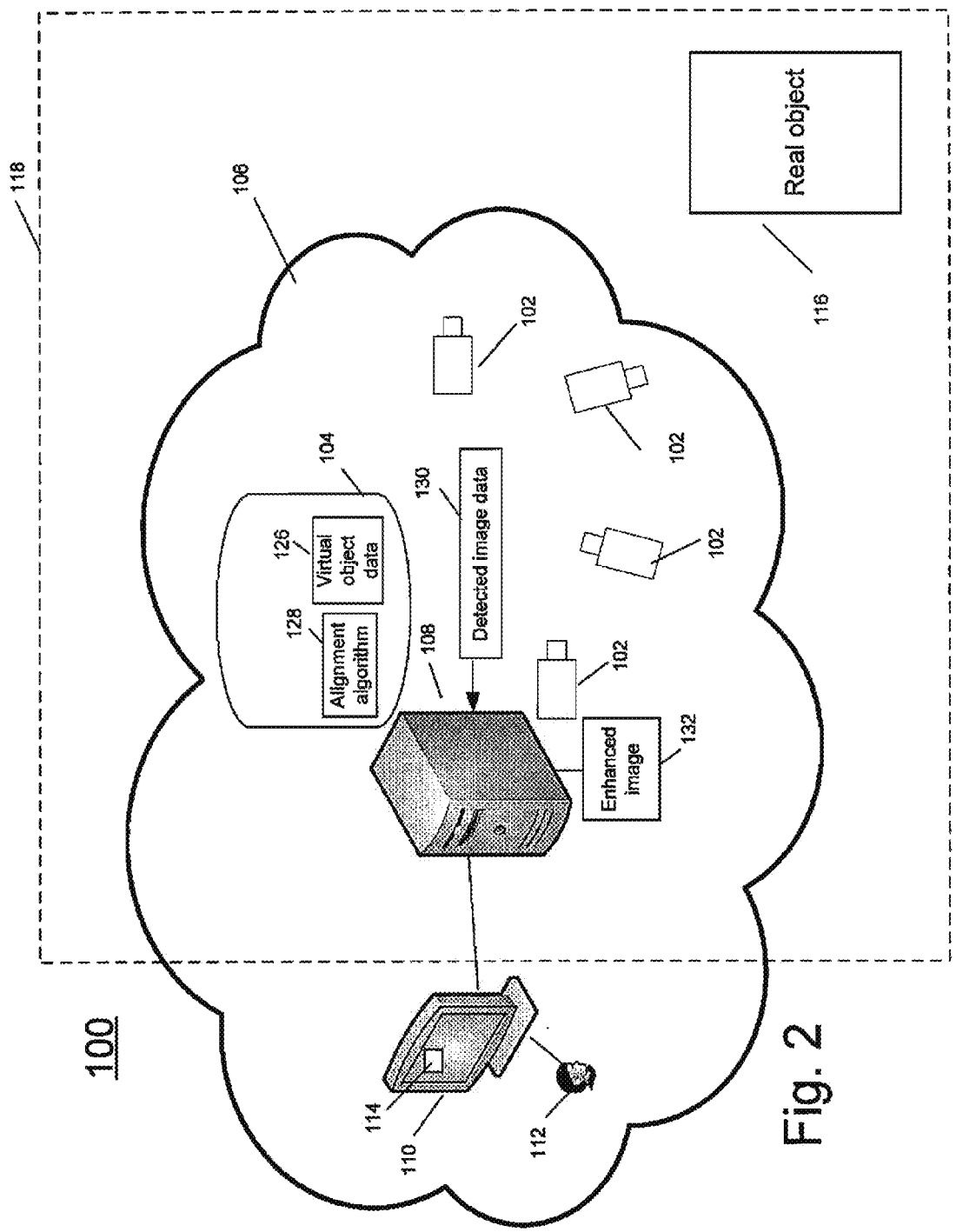
FIG. 2 illustrates some example systems that can be utilized to implement alignment of objects in augment reality.

FIG. 2 illustrates some example system that can be utilized to implement alignment of objects in augmented reality in accordance with at least some embodiments presented herein. The system of FIG. 2 is substantially similar to system 100 of FIG. 1, with additional details. Those components in FIG. 2 that are labeled identically to components of FIG. 1 will not be described again for the purposes of clarity.

Memory 104 may be adapted to store an alignment algorithm 128 and virtual object data 126. Processor 108 may be adapted to receive detected image data 130 from sensors 102 relating to object 116. In some examples, detected image data 130 may include noise and image data in the form of pixels and feature points. Feature points may include, for example, features in an image that could be used to align a real image with a virtual image. For example, if detected image data 130 relates to a face, a feature could be a nose, eyes, etc. As discussed above, processor 108 may be adapted to receive virtual object data 126. Processor 108 may be adapted to align virtual object data 126 with detected image data 130 using alignment algorithm 128 to produce an enhanced image 132. Processor 108 may be adapted to display enhanced image 132 to display 110.

Some example augmented reality applications may benefit from accurate alignment as will be described. If the virtual object data adds information regarding an object, the virtual object data should accurately align with an image of real data or the illusion of augmented reality may be compromised. In an example in the medical field, the real image could be of an organ and the virtual object data may indicate where a tumor exists. Alignment of virtual and real data in such a situation is important.

Figure 3:
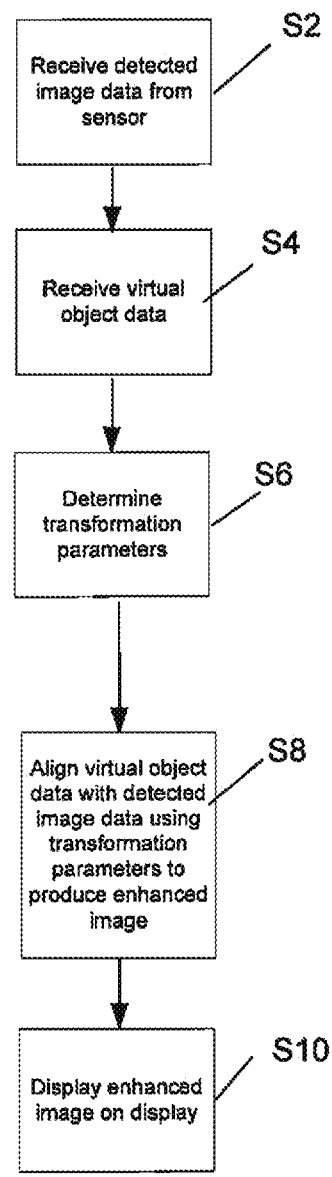
FIG. 3 depicts a flow diagram for example processes for alignment of objects in augment reality.

FIG. 3 depicts a flow diagram for example processes for alignment of objects in augmented reality in accordance with at least some embodiments of the present disclosure. The process in FIG. 3 could be implemented using, for example, system 100 discussed above. An example process may include one or more operations, actions, or functions as illustrated by one or more of blocks S2, S4, S6, S8, and/or S10. Although illustrated as discrete blocks, various blocks may be divided into additional blocks, combined into fewer blocks, or eliminated, depending on the desired implementation. Processing may begin at block S2.

At block S2, a processor may be adapted to receive detected image data regarding a real object from a sensor. Processing may continue from block S2 to block S4.

At block S4, the processor may be adapted to receive virtual object data regarding the real object. Processing may continue from block S4 to block S6.

At block S6, the processor may be adapted to determine transformation parameters. The transformation parameters could be used in a transformation, such as an affine transformation, to map the real detected image data to the virtual object data. Alternatively, in other examples, the transformation parameters could be used to map virtual object data to the detected image data. In other examples, the transformation parameters could be used to map both the detected image data and virtual object data to an existing image. Processing may continue from block S6 to block S8.

At block S8 the processor may be adapted to align the virtual object data with the detected image data using the transformation parameters to produce an enhanced image. Processing may continue from block S8 to block S10.

At block S10, the processor may be adapted to display the enhanced image on a display.

Figure 4:
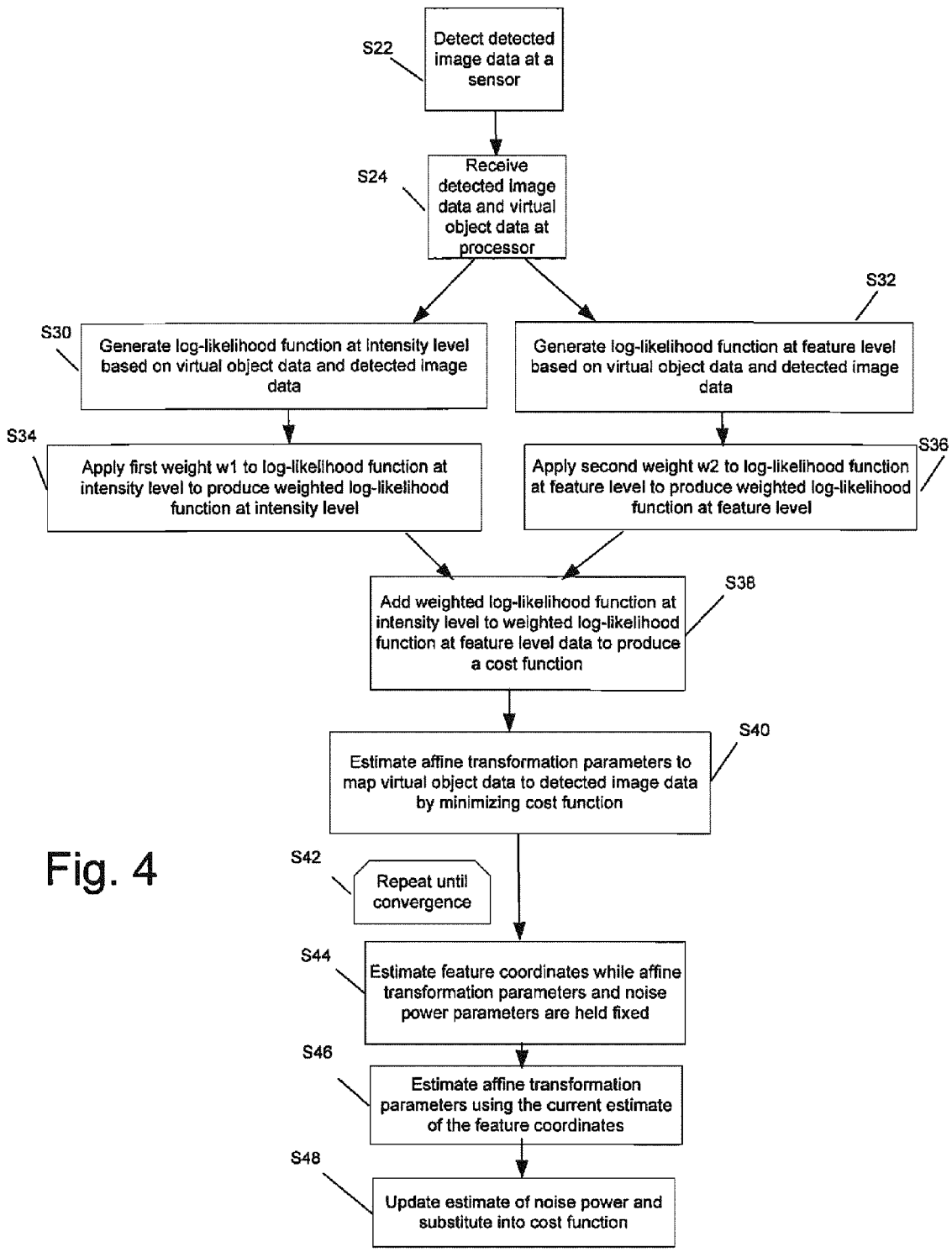
FIG. 4 depicts a flow diagram for example processes for alignment of objects in augment reality.

FIG. 4 depicts a flow diagram for example processes for alignment of objects in augmented reality in accordance with at least some embodiments of the present disclosure. The process in FIG. 4 could be implemented using, for example, system 100 discussed above and explains example operations for S6 of FIG. 3 in more detail. An example process may include one or more operations, actions, or functions as illustrated by one or more of blocks S22, S24, S30, S32, S34, S36, S38, S40, S42, S44, S46 and/or S48. Although illustrated as discrete blocks, various blocks may be divided into additional blocks, combined into fewer blocks, or eliminated, depending on the desired implementation. Processing may begin at block S22.

At block S22, a sensor may be adapted to detect detected image data relating to a real object. Processing may continue from block S22 to block S24.

At block S24 a processor may be adapted to receive the detected image data and virtual object data. For example, the detected image data may be based on a real object and may include both image data and noise data. In some examples, the virtual object data may be additional virtual information to be added to an image of the object on a display. Processing may continue from block S24 to blocks S30 and S32.

At block S30, the processor may be adapted to generate a log-likelihood function at an intensity level based on the virtual object data and the detected image data. For example, the intensity levels of the detected image data and the virtual object data could be based on compared intensities for the same modalities. Examples of modalities could be visual or infrared images. In generating the log-likelihood functions, image transformation models and noise transformation models may be used. In some examples, the image transformation model could include an affine transformation model, a rigid transformation model, piecewise affine transformation model, non-rigid or elastic transformation model, etc. In some examples, the noise transformation model could be based on statistical properties of noise such as a Gaussian model, a mixture Gaussian model, etc. Processing may continue from block S30 to block S34.

At block S32, the processor may be adapted to generate a log-likelihood function at a feature level based on the virtual object data and the detected image data For example, features at selected control points in the detected image data and the virtual object data could be used. Control points could be selected through, for example, the use of edge detection algorithms. Other examples of control points could be landmarks or intersections. Continuing with one of the examples mentioned above, an edge detection algorithm could be used to detect a nose on a face in an image. The nose could then be used as a control point for the log-likelihood function at a feature level. Processing may continue from block S32 to block S36.

At block S34, the processor may be adapted to apply a first weight w1 to the log-likelihood function at intensity level to produce a weighted log-likelihood function at intensity level. Processing may continue from block S34 to block S38.

At block S36, the processor may be adapted to apply a second weight w2 to the log-likelihood function at feature level to produce a weighted log-likelihood function at feature level. Weights w1 and w2 may be assigned based on a number of available pixels and features points in the detected image data and based on a noise power in the detected image data. For example, weight w1 for the intensity level data may be assigned a larger value than weight w2 for the feature level data if the number of available pixels is greater than the number of available feature points in the detected image data. Similarly, a large noise power at the feature level may cause weight w2 applied to the feature level data to be smaller than weight w1. Weights w1 and w2 may be thus proportional to how much information is available such as available pixels and a level of noise power. In some examples, if the number of available pixels and features is zero or the noise power is very large, a corresponding weight w1, w2 may be set to zero. Processing may continue from block S36 to block S38.

At block S38, the processor may be adapted to add the weighted log-likelihood function at intensity level to the weighted log-likelihood function at feature level data to produce a cost function. Among other parameters, the cost function may be a function of: 1) transformation parameters, such as in an affine transformation 2) feature coordinates and 3) a noise power. As discussed above, the transformation parameters may be used to align virtual object data 126 (FIG. 2) to detected image data 130. Alternatively, detected image data 130 may be aligned with virtual object data 126 or both detected image data and virtual object data may be aligned to a third image. The feature coordinates may be locations of features in detected image data 130. Noise power may be a power level of noise in the detected image data. Processing may continue from block S38 to S40.

At block S40 the processor may be adapted to estimate the affine transformation parameters to map the virtual object data to the detected image data by minimizing the cost function. For example, all of the parameters may be adjusted to minimize the cost function to obtain a first estimate of the affine transformation parameters. Processing may continue from block S40 to block S42.

At block S42 a loop may be defined so that a processor may be adapted to perform the next three operations until the cost function converges. Processing may continue from block S42 to block S44.

At block S44, the processor may be adapted to estimate feature coordinates of the cost function, Operation S42 may be performed while the affine transformation parameters and noise power parameters of the cost function are held fixed. Processing may continue from block S44 to block S46.

At block S46, the processor may be adapted to estimate affine transformation parameters using a current estimate of the feature coordinates. Processing may continue from block S46 to block S48.

At block S48, the processor may be adapted to estimate a noise power in the cost function using a current estimate of the feature parameters and the affine transformation parameters.

An updated cost function may be defined by one or more of blocks S44, S46, and/or S48. The loop defined by block S42 may continue until the updated cost function converges. For example, the loop defined in block S42 may continue until changes made in the cost function in operations S44, S46 and S48 are below a threshold. In another example, the loop defined by block S42 may continue until one of the likelihood functions in the cost function does not change beyond a threshold.

An example process for determining a cost function is shown below where a Gaussian distributed noise model and affine transformation model are shown for illustration purposes.

In the example, system 100 may receive two images: a reference image 126 (e.g., virtual image) and a distorted image (e.g., detected real image) 130. At a feature level, let $X_1(k)=[x_1(k),y_1(k)]^T$ and $X_0(k)=[x_0(k),y_0(k)]^T$ denote the true coordinates of the k-th corresponding feature in the reference and distorted images, respectively, $k=1, 2, \ldots, N_1$, where $N_1$ is the total number of features. These features may be linked by an affine transformation given by $$X_1(k)=t+RX_0(k)$$

where $t=[tx,ty]^T$ represents the x- and y-axis translations, R is the affine transformation matrix between the reference and the distorted images and is given by $$R = \begin{pmatrix} 1+r_{11} & r_{12} \\ r_{21} & 1+r_{22} \end{pmatrix}$$

where the four elements of R cover combinations of rotation, skewing, shearing and scaling between the reference and the distorted images. Let $X_A(k)=[x_A(k),y_A(k)]^T$ and $X_B(k)=[x_B(k),y_B(k)]^T$ denote the measured coordinates of the corresponding features in the reference and distorted images, respectively. The feature measurement model can be expressed as $$x_A(k)=x_0(k)+n_1(k)$$

$$y_A(k)=y_0(k)+n_2(k)$$

$$x_B(k)=(1+r_{11})x_0(k)+r_{12}y_0(k)+tx+n_3(k)$$

$$y_B(k)=r_{21}x_0(k)+(1+r_{22})y_0(k)+ty+n_4(k)$$

where $n_i(i=1, 2, 3, 4)$ are assumed to be white Gaussian noise with zero mean and variance $\delta_1^2$. The above equation can be re-written in a matrix form as $$x(k) = A(k)\eta + b(k) + n(k)$$

where $$x(k) = [(X_A(k))^T, (X_B(k))^T]^T$$

$$b(k) = [(X_0(k))^T, (X_0(k))^T]^T$$

$$n(k) = [n_1(k), n_2(k), n_3(k), n_4(k)]^T$$

$$\eta = [r_{11}, r_{12}, r_{21}, r_{22}, tx, ty]^T$$

$$A(k) = \begin{pmatrix} 0 & 0 & 0 & 0 & 0 & 0 \\ 0 & 0 & 0 & 0 & 0 & 0 \\ x_0(k) & y_0(k) & 0 & 0 & 1 & 0 \\ 0 & 0 & x_0(k) & y_0(k) & 0 & 1 \end{pmatrix}$$

where x(k), n(k), and η represent the vectors for measurements, noise, and registration parameters, respectively. The covariance matrix of n(k) is equal to $\delta_1^2 I$, where I is the identity matrix.

At the intensity measurement level, in the example, the size of the reference image may be $M_1 \times M_2$. Let Ω denote the overlapping region of the reference and distorted images, and there are $N_2$ pixels in Ω. Given the coordinate $u_0(i,j)=[u_0(i), v_0(j)]^T$ of a pixel in the reference image, the coordinate $u_1(i,j)=[u_1(i),v_1(j)]^T$ of the corresponding pixel in the distorted image can be related by $$u_1(i,j)=t+Ru_0(i,j)$$

where again $t=[tx,ty]^T$ represents the x- and y-axis translations, R is the affine transformation matrix between the reference and the distorted images. Suppose the true values of pixels $u_0(i, j)$ and $u_1(i, j)$ are $f_0(u_0(i, j))$ and $f_1(u_1(i, j))$, correspondingly, the measurement gray value of the pixel $u_1(i, j)$ can be expressed as $$f_A(u_1(i,j))=f_1(u_1(i,j))+n_5(i,j)$$

where $n_5$ is a white Gaussian noise with zero mean and variance $\delta_2^2$.

Based on the above measurements models at both feature and intensity level, the likelihood function can be written as $$L = \frac{1}{\left(\sqrt{2\pi}\right)^{N1+N2} \delta_1^{N1} \delta_2^{N2}} L_1 L_2$$

where $$L_1 = \exp\left(-\frac{1}{2\delta_1^2} \sum_{k=1}^{N1} \{x(k) - A(k)\eta - b(k)\}^T \{x(k) - A(k)\eta - b(k)\}\right)$$

$$L_2 = \exp\left(-\frac{1}{2\delta_2^2} \sum_{(i,j)\in\Omega}^{N2} \{f_A(u_1(i,j)) - f_1(u_1(i,j))\}^2\right)$$

Therefore the log-likelihood function may be the sum of two log-likelihood functions $\log(L_1)$ and $\log(L_2)$ with weights proportional to the number of available feature/pixel points.

The cost function may then be the sum of the two log-likelihood functions $\log(L_1)$ and $\log(L_2)$, and may be minimized. The cost function is a function of affine transformation parameters η, and the noise parameters $\delta_1^2$ and $\delta_2^2$. Minimization of the cost function will lead to an estimate of those parameters η, $\delta_1^2$ and $\delta_2^2$. Parameters η, $\delta_1^2$ and $\delta_2^2$ are changed to minimize the cost function as discussed above.

Among other benefits, a system arranged in accordance with the present disclosure can automatically select an information level to perform in alignment of real and virtual image data. If intensity level information or feature level information is not available or of too poor quality, a system arranged in accordance with the present disclosure can be adapted to select a level with lower noise. If no intensity level data is available, a system arranged in accordance with the present disclosure may be adapted to use a maximum likelihood approach for feature level registration.

FIG. 5 illustrates an example computer program products 300 for alignment of objects in augmented reality in accordance with at least some examples of the present disclosure. Program product 300 may include a signal hearing medium 302. Signal bearing medium 302 may include one or more instructions 304 that, when executed by, for example, a processor, may provide at least some of the functions described above with respect to FIGS. 1-4. Thus, for example, referring to system 100, processor 108 may undertake one or more of the blocks shown in FIG. 4 in response to instructions 304 conveyed to the system 100 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 302, where the signal bearing medium 302 is conveyed by a wireless communications medium 310 (e.g., a wireless communications medium conforming with the IEEE 80211 standard).

Figure 6:
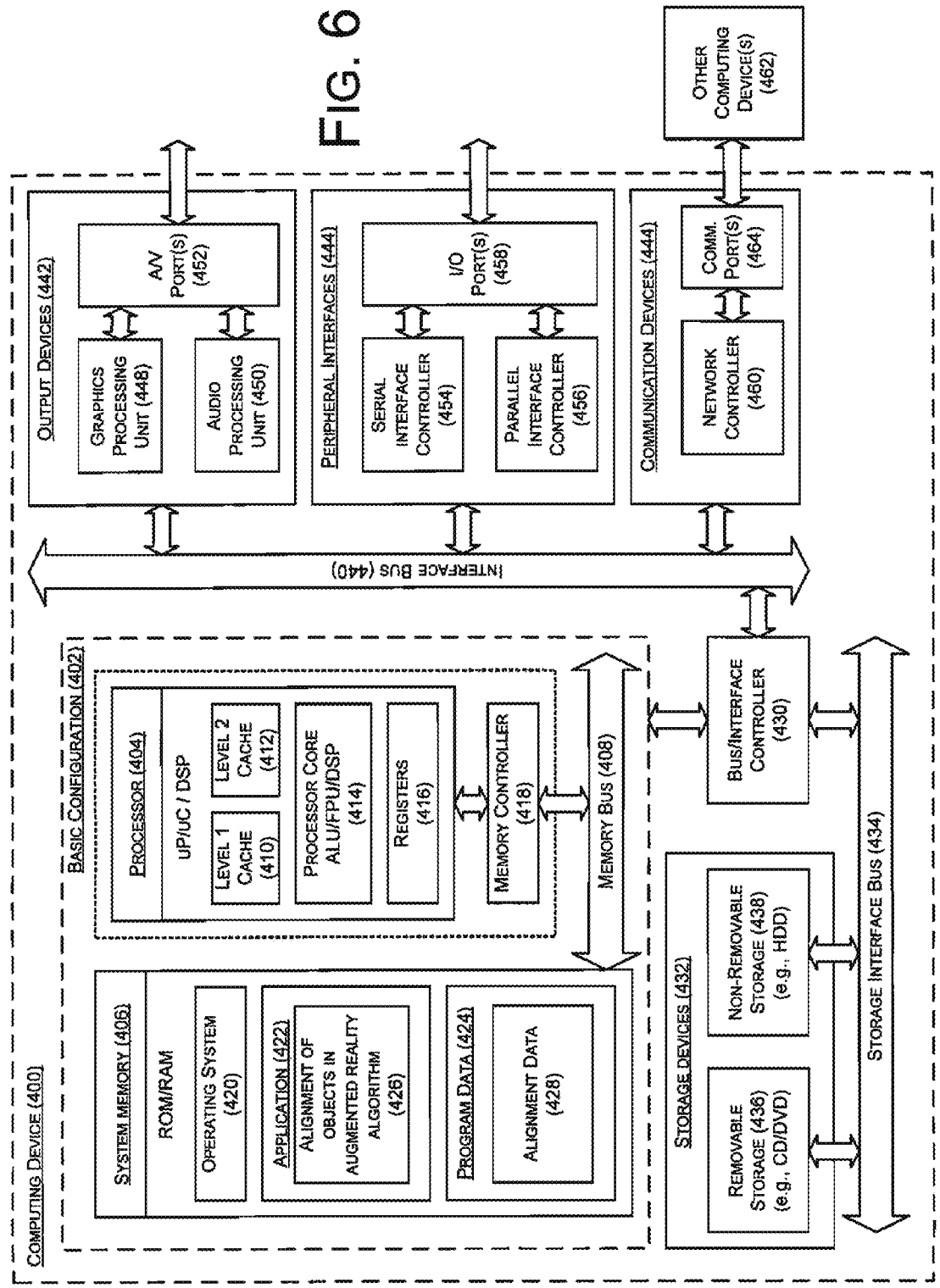
FIG. 6 is a block diagram illustrating some example computing devices that are adapted to perform alignment of objects in augmented reality.

FIG. 6 is a block diagram illustrating some example computing devices 400 that are arranged to perform alignment of objects in augmented reality in accordance with at least some embodiments of the present disclosure. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor ($\mu P$), a microcontroller ($\mu C$), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include an alignment of objects in augmented reality algorithm 426 that may be arranged to perform one or more of the functions as described herein including those described with respect to FIGS. 1-5. Program data 424 may include alignment data 428 that may be useful for alignment of objects in augmented reality as is described herein. In some embodiments, application 422 may be arranged to operate with program data 424 on operating system 420 such that alignment of objects in augmented reality may be provided. This described basic configuration 402 is illustrated in FIG. 11 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

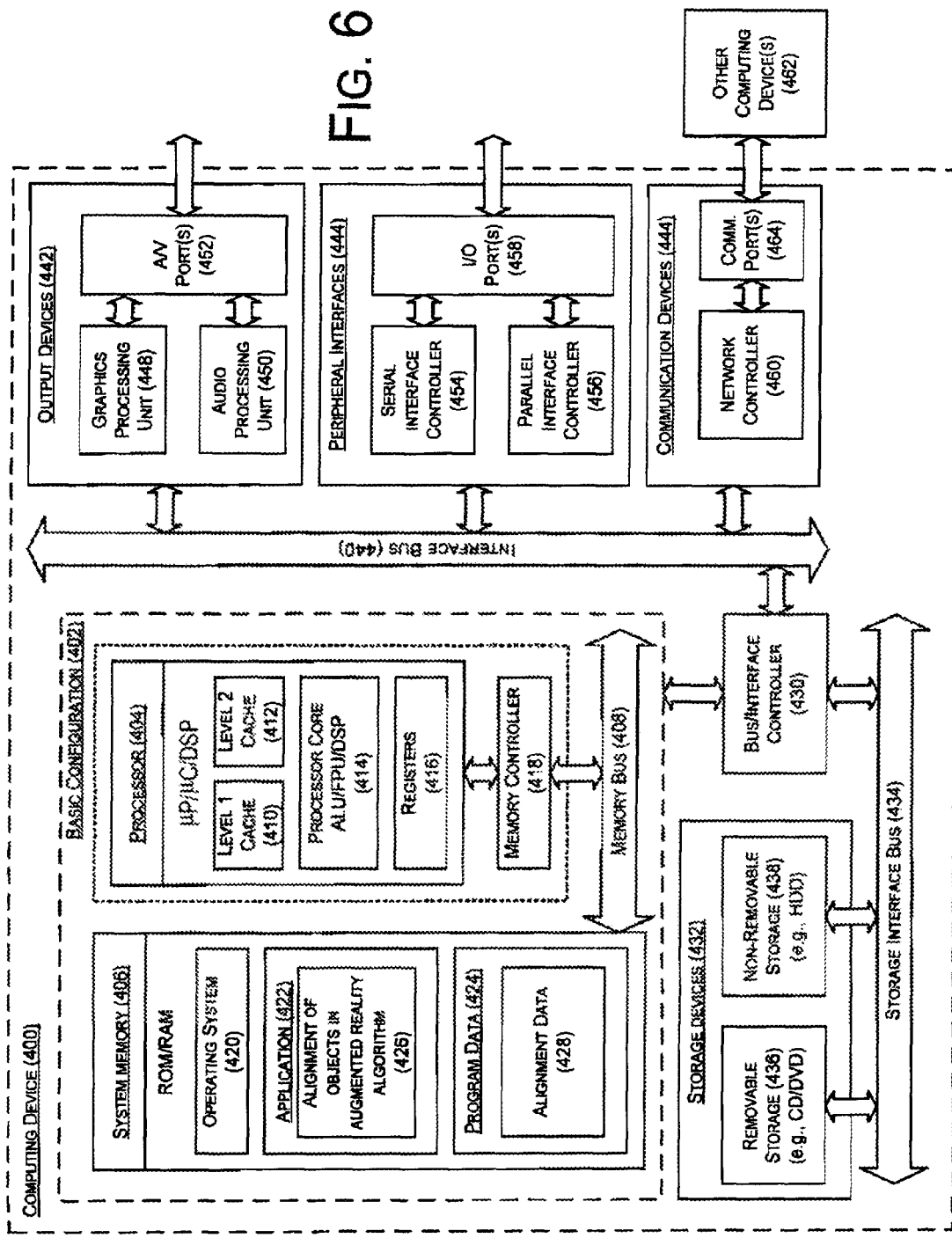

What is claimed is:

1. A method for aligning data regarding a real object and a virtual object in an augmented reality system, the method comprising:
    receiving detected image data at a processor, wherein the detected image data relates to the real object;
    receiving virtual object data at the processor, wherein the virtual object data is representative of the virtual object in the augmented reality system;
    generating, by the processor, a log-likelihood function at intensity level based on the virtual object data and the detected image data;
    generating, by the processor, a log-likelihood function at feature level based on the virtual object data and the detected image data;
    applying, by the processor, a first weight to the log-likelihood function at intensity level to produce a weighted log-likelihood function at intensity level;

applying, by the processor, a second weight to the log-likelihood function at feature level to produce a weighted log-likelihood function at feature level;

adding, by the processor, the weighted log-likelihood function at intensity level to the weighted log-likelihood function at feature level to produce a cost function; and determining, by the processor, transformation parameters for the detected image data based on the cost function; wherein the transformation parameters are effective to align the detected image data with the virtual object data.

2. The method as recited in claim 1, further comprising aligning, by the processor, the detected image data with the virtual object data using the transformation parameters to produce an enhanced image.

3. The method as recited in claim 2, further comprising displaying the enhanced image on a display, wherein the enhanced image on the display is representative of the virtual object in the augmented reality system.

4. The method as recited in claim 1, wherein determining, by the processor, transformation parameters for the detected image data comprises minimizing the cost function.

5. The method as recited in claim 1, wherein determining, by the processor, alignment parameters for the detected image data further comprises estimating, by the processor, feature coordinates of the cost function while the transformation parameters and noise power parameters of the cost function are held fixed.

6. The method as recited in claim 1, wherein determining, by the processor, alignment parameters for the detected image data further comprises estimating, by the processor, the transformation parameters of the cost function using a current estimate of the feature coordinates of the cost function.

7. The method as recited in claim 1, wherein determining, by the processor, alignment parameters for the detected image data further comprises updating, by the processor, an estimate of a noise power parameter of the cost function and substituting the estimate of the noise power parameter into the cost function.

8. The method as recited in claim 1, wherein determining, by the processor, alignment parameters for the detected image data comprises:
   minimizing the cost function; and
   repeating the following until the cost function is determined to converge:
      estimating, by the processor, feature coordinates of the cost function while the transformation parameters and noise power parameters of the cost function are held fixed;
      estimating, by the processor, the transformation parameters of the cost function using a current estimate of the feature coordinates of the cost function; and
      updating, by the processor, an estimate of the noise power parameters of the cost function and substituting the estimate of the noise power parameters into the cost function.

9. The method as recited in claim 1, wherein the first and second weights are based on a number of pixels in the detected image data.

10. The method as recited in claim 1, wherein the first and second weights are based on a noise power in the detected image data.

11. The method as recited in claim 1, wherein generating the log-likelihood function at intensity level and generating the log-likelihood function at feature level includes using a Gaussian noise model.

12. The method as claimed in claim 1, wherein generating the log-likelihood function at intensity level and generating the log-likelihood function at feature level includes using an image transformation model that is at least one of an affine transformation model, a rigid transformation model, or an elastic transformation model.

13. The method as recited in claim 1, wherein the log-likelihood function at feature level is based on an edge in the detected image data.

14. A device for aligning data regarding a real object and a virtual object in augmented reality, the device comprising:
   a processor; and
   a memory arranged in communication with the processor; the processor effective to
      receive detected image data, wherein the detected image data relates to the real object;
      receive virtual object data, wherein the virtual object data is associated with the virtual object in the augmented reality;
      generate a log-likelihood function at intensity level based on the virtual object data and the detected image data;
      generate a log-likelihood function at feature level based on the virtual object data and the detected image data;
      apply a first weight to the log-likelihood function at intensity level to produce a weighted log-likelihood function at intensity level;
      apply a second weight to the log-likelihood function at feature level to produce a weighted log-likelihood function at feature level;
      add the weighted log-likelihood function at intensity level data to the weighted log-likelihood function at feature level to produce a cost function;
      determine transformation parameters for the detected image data based on the cost function; wherein the transformation parameters are effective to align the detected image data with the virtual object data; and
      store the transformation parameters in the memory.

15. The device as recited in claim 14, wherein the processor is further effective to align the detected image data with the virtual object data using the transformation parameters to produce enhanced image data.

16. The device as recited in claim 15, further comprising a display arranged in communication with the processor, wherein the display is effective to display the enhanced image data, wherein the enhanced image data is representative of the virtual object in the augmented reality [system].

17. The device as recited in claim 14, wherein the processor is further effective to
   minimize the cost function; and
   repeat the following until the cost function is determined to converge:
      estimate feature coordinates of the cost function while the transformation parameters and noise power parameters of the cost function are held fixed;
      estimate the transformation parameters of the cost function using a current estimate of the feature coordinates of the cost function; and
      update an estimate of the noise power parameters of the cost function and substitute the estimate of the noise power parameters into the cost function.

18. The device as recited in claim 14, wherein the first and second weights are based on a number of pixels in the detected image data.

19. The device as recited in claim 14, wherein the first and second weights are based on a noise power in the detected image data.

20. A system for aligning data regarding a real object and a virtual object in augmented reality, the system comprising:

a processor;
a sensor arranged in communication with the processor, the sensor effective to detect detected image data, and send the detected image data from the sensor to the processor, wherein the detected image data relates to the real object;
a memory arranged in communication with the processor;
a display arranged in communication with the processor;
the processor effective to
receive the detected image data;
receive virtual object data, wherein the virtual object data is associated with the virtual object in the augmented reality;
generate a log-likelihood function at intensity level based on the virtual object data and the detected image data;
generate a log-likelihood function at feature level based on the virtual object data and the detected image data;
apply a first weight to the log-likelihood function at intensity level to produce a weighted log-likelihood function at intensity level;
apply a second weight to the log-likelihood function at feature level to produce a weighted log-likelihood function at feature level;
add the weighted log-likelihood function at intensity level [data] to the weighted log-likelihood function at feature level to produce a cost function;
determine transformation parameters for the detected image data based on the cost function; wherein the transformation parameters are effective to align the detected image data with the virtual object data;
store the transformation parameters in the memory; and
align the detected image data with the virtual object data using the transformation parameters to produce enhanced image data; and
wherein the display is effective to display the enhanced image data.

21. The system as recited in claim 20, wherein the processor is further effective to:
minimize the cost function; and
repeat the following until the cost function is determined to converge:
estimate feature coordinates of the cost function while the transformation parameters and noise power parameters of the cost function are held fixed;
estimate the transformation parameters of the cost function using a current estimate of the feature coordinates of the cost function; and
update an estimate of the noise power parameters of the cost function and substitute the estimate of the noise power parameters into the cost function.

22. The system as recited in claim 20, wherein the first and second weights are based on a number of pixels in the detected image data.

23. The system as recited in claim 20, wherein the first and second weights are based on a noise power in the detected image data.

24. A method for aligning data regarding a real object and a virtual object in an augmented reality system, the method comprising:
detecting detected image data by a sensor, wherein the detected image data relates to the real object;
sending the detected image data from the sensor to a processor;
receiving the detected image data by the processor;
receiving virtual object data at the processor, wherein the virtual object data is representative of the virtual object in the augmented reality system;
generating, by the processor, a log-likelihood function at intensity level based on the virtual object data and the detected image data;
generating, by the processor, a log-likelihood function at feature level based on the virtual object data and the detected image data;
applying, by the processor, a first weight to the log-likelihood function at intensity level to produce a weighted log-likelihood function at intensity level;
applying, by the processor, a second weight to the log-likelihood function at feature level to produce a weighted log-likelihood function at feature level;
adding, by the processor, the weighted log-likelihood function at intensity level to the weighted log-likelihood function at feature level to produce a cost function;
determining, by the processor, transformation parameters for the detected image data based on the cost function, where the transformation parameters are effective to align the detected image data with the virtual object data;
aligning the detected image data with the virtual object data using the transformation parameters by the processor to produce enhanced image data; and
displaying the enhanced image data on a display, wherein the enhanced image data is representative of the virtual object in the augmented reality system.

25. The method as recited in claim 24, wherein determining, by the processor, [alignment] transformation parameters for the detected image data comprises:
minimizing the cost function; and
repeating the following until the cost function is determined to converge:
estimating, by the processor, feature coordinates of the cost function while the transformation parameters and noise power parameters of the cost function are held fixed;
estimating, by the processor, the transformation parameters of the cost function using a current estimate of the feature coordinates of the cost function; and
updating, by the processor, an estimate of the noise power parameters of the cost function and substituting the estimate of the noise power parameters into the cost function.

26. The method as recited in claim 24, wherein the first and second weights are based on a number of pixels in the detected image data.

27. The method as recited in claim 24, wherein the first and second weights are based on a noise power in detected image data.

28. A non-transitory computer storage medium having computer-executable instructions stored thereon which, when executed by a computing device, adapt the computing device to perform a method for aligning data regarding a real object and a virtual object in an augmented reality system, the method comprising:
receiving detected image data at a processor, wherein the detected image data relates to the real object;
receiving virtual object data at the processor, wherein the virtual object data is representative of the virtual object in the augmented reality system;
generating, by the processor, a log-likelihood function at intensity level based on the virtual object data and the detected image data;
generating, by the processor, a log-likelihood function at feature level based on the virtual object data and the detected image data;

applying, by the processor, a first weight to the log-likelihood function at intensity level to produce a weighted log-likelihood function at intensity level;

applying, by the processor, a second weight to the log-likelihood function at feature level to produce a weighted log-likelihood function at feature level;

adding, by the processor, the weighted log-likelihood function at intensity level to the weighted log-likelihood function at feature level to produce a cost function; and determining, by the processor transformation parameters for the detected image data based on the cost function; wherein the transformation parameters are effective to align the detected image data with the virtual object data.

29. The computer readable storage medium as recited in claim 28, wherein the method further comprises:

minimizing the cost function; and repeating the following until the cost function is determined to converge:

estimating, by the processor, feature coordinates of the cost function while the transformation parameters and noise power parameters of the cost function are held fixed;

estimating, by the processor, the transformation parameters of the cost function using a current estimate of the feature coordinates of the cost function; and updating, by the processor, an estimate of the noise power parameters of the cost function and substituting the estimate of the noise power parameters into the cost function.

* * * * *

UNITED STATES PATENT AND TRADEMARK OFFICE
CERTIFICATE OF CORRECTION

PATENT NO. : 8,416,263 B2
APPLICATION NO. : 12/719100
DATED : April 9, 2013
INVENTOR(S) : Leung Page 1 of 3

It is certified that error appears in the above-identified patent and that said Letters Patent is hereby corrected as shown below:

On the title page, item (56), under "OTHER PUBLICATIONS", in Column 1, Line 1, delete ""Multimodiality" and insert -- "Multimodality --, therefor.

On the title page, item (56), under "OTHER PUBLICATIONS", in Column 2, Line 1, delete "Agumented Reality":" and insert -- Augmented Reality", --, therefor.

On the title page, item (56), under "OTHER PUBLICATIONS", in Column 2, Line 11, delete "bmei," and insert -- BMEI 2008, --, therefor.

In the Drawings:

In Fig. 6, Sheet 6 of 6, below "PROCESSOR (404)" delete "UP/UC / DSP" and insert -- $\mu P/\mu C/DSP$ --, therefor.

In the Specifications:

In Column 6, Line 64, delete "perform in" and insert -- perform --, therefor

In Column 7, Line 8, delete "hearing" and insert -- bearing --, therefor.

In Column 7, Line 32, delete "80211" and insert -- 802.11 --, therefor.

In the Claims:

In Column 12, Line 12, in Claim 14, delete "to" and insert -- to: --, therefor.

Signed and Sealed this
Twenty-seventh Day of August, 2013

Teresa Stanek Rea
*Acting Director of the United States Patent and Trademark Office*

CERTIFICATE OF CORRECTION (continued)
U.S. Pat. No. 8,416,263 B2

In Column 12, Line 45, in Claim 16, delete "reality [system]." and insert -- reality. --, therefor.

In Column 12, Line 47, in Claim 17, delete "to" and insert -- to: --, therefor.

In Column 13, Line 9, in Claim 20, delete "to" and insert -- to: --, therefor.

In Column 13, Line 25, in Claim 20, delete "[data] to" and insert -- to --, therefor.

In Column 14, Line 29, in Claim 25, delete "[alignment] transformation" and insert -- transformation --, therefor.

In Column 14, Line 51, in Claim 28, delete "computer storage" and insert -- computer readable storage --, therefor.

In Column 15, Line 14, in Claim 29, delete "The computer readable storage medium" and insert -- The non-transitory computer readable storage medium --, therefor.